(12) United States Patent
Wang et al.

(10) Patent No.: US 10,185,598 B2
(45) Date of Patent: Jan. 22, 2019

(54) METHOD AND SYSTEM FOR OFFLOADING INDUSTRIAL TASKS IN A HUMAN-MACHINE INTERFACE PANEL TO OTHER DEVICES

(71) Applicant: Siemens Aktiengesellschaft, Munich (DE)

(72) Inventors: Lingyun Wang, Princeton, NJ (US); Arquimedes Martinez Canedo, Plainsboro, NJ (US); Holger Strobel, Steinbach (DE)

(73) Assignee: Siemens Akitiengesellschaft, Munich (DE)

( * ) Notice: Subject to any disclaimer, the term of this patent is extended or adjusted under 35 U.S.C. 154(b) by 3 days.

(21) Appl. No.: 15/038,051

(22) PCT Filed: May 8, 2014

(86) PCT No.: PCT/US2014/037229
§ 371 (c)(1),
(2) Date: May 20, 2016

(87) PCT Pub. No.: WO2015/080764
PCT Pub. Date: Jun. 4, 2015

(65) Prior Publication Data
US 2016/0299796 A1  Oct. 13, 2016

Related U.S. Application Data

(60) Provisional application No. 61/908,918, filed on Nov. 26, 2013.

(51) Int. Cl.
*G06F 9/50* (2006.01)
*G05B 19/418* (2006.01)
*G05B 19/409* (2006.01)

(52) U.S. Cl.
CPC ........ *G06F 9/5088* (2013.01); *G05B 19/409* (2013.01); *G05B 19/41835* (2013.01);
(Continued)

(58) Field of Classification Search
None
See application file for complete search history.

(56) References Cited

U.S. PATENT DOCUMENTS 6,959,225 B1 * 10/2005 Logsdon .......... G05B 19/41865
700/100
7,721,273 B1  5/2010 Hall et al.
(Continued)

FOREIGN PATENT DOCUMENTS

CN        1558574 A        12/2001
CN     101123619 A  *   2/2008
(Continued)

OTHER PUBLICATIONS

International Search Report dated Sep. 19, 2014; PCT/US2014/037229; International Filing Date: May 8, 2014; 12 pages.
(Continued)

*Primary Examiner* — Abu Ghaffari

(57) ABSTRACT

In an industrial automation environment, a three-tier architecture is used to offload human-machine-interaction (HMI) automation tasks to local mobile devices and then the cloud, to take advantage of distributed computing and processing resources and to add new features to the HMI panel system. A scheduling algorithm based on the characteristics of the HMI tasks distributes these tasks intelligently among the local HMI panel, mobile devices and the cloud, to best utilize the merits of each tier.

20 Claims, 16 Drawing Sheets

(52) U.S. Cl.
CPC .............. *G05B 2219/23149* (2013.01); *G05B 2219/31264* (2013.01); *G05B 2219/31476* (2013.01)

(56) References Cited

U.S. PATENT DOCUMENTS

| | | | | |
|---|---|---|---|---|
| 7,836,168 | B1* | 11/2010 | Vasko | G05B 19/0421 709/224 |
| 7,958,518 | B1* | 6/2011 | Willeford | G06F 9/54 717/124 |
| 8,583,802 | B2* | 11/2013 | Schultz | G06Q 10/10 709/227 |
| 9,137,301 | B1* | 9/2015 | Dunlap | H04L 67/101 |
| 2003/0071845 | A1* | 4/2003 | King | G06F 9/542 715/764 |
| 2003/0174122 | A1* | 9/2003 | Dinges | G06F 3/0481 345/156 |
| 2003/0195854 | A1* | 10/2003 | Wittkotter | G06F 21/10 705/51 |
| 2004/0236451 | A1* | 11/2004 | Parsons | G05B 19/409 700/108 |
| 2004/0260518 | A1 | 12/2004 | Polz et al. | |
| 2008/0147206 | A1* | 6/2008 | Zahrai | B25J 9/161 700/19 |
| 2008/0316021 | A1* | 12/2008 | Manz | G06F 19/3418 340/539.13 |
| 2009/0300419 | A1* | 12/2009 | Silverman | G06F 11/2294 714/30 |
| 2010/0125673 | A1* | 5/2010 | Richardson | H04L 29/12066 709/239 |
| 2010/0287560 | A1* | 11/2010 | Neft | G06F 9/4856 718/104 |
| 2011/0137934 | A1* | 6/2011 | Pizzorni | G06F 8/60 707/769 |
| 2011/0255125 | A1* | 10/2011 | Gnanasambandam | G06F 3/1211 358/1.15 |
| 2012/0042319 | A1* | 2/2012 | Hildrum | G06F 9/4881 718/104 |
| 2012/0096302 | A1* | 4/2012 | Tabelander | H04L 12/40026 713/600 |
| 2012/0311592 | A1* | 12/2012 | Kim | G06F 9/4887 718/102 |
| 2014/0089643 | A1* | 3/2014 | Nishimoto | G06F 9/3001 712/221 |
| 2014/0132606 | A1* | 5/2014 | Wang | G06T 19/00 345/427 |
| 2014/0365258 | A1* | 12/2014 | Vestal | G06Q 10/063114 705/7.15 |

FOREIGN PATENT DOCUMENTS

| | | | |
|---|---|---|---|
| CN | 101923487 A | * | 12/2010 |
| CN | 102253657 A | * | 11/2011 |
| CN | 102323895 A | * | 1/2012 |
| RU | 2364917 C2 | | 8/2009 |
| RU | 2523164 C2 | | 7/2014 |
| WO | 2012112302 A2 | | 12/2004 |

OTHER PUBLICATIONS

Report of Examination; Application No. 2016125228 ; Filing Date: May 8, 2014; 196-pages.

Jin, Hong et al.: "An Integrated Design Method of Task Priority" in: Journal of Software, vol. 14, No. 3; pp. 376-382.

Report of Examination; Application No. 201480064578.1; Filing Date: May 8, 2014; 6-pages.

* cited by examiner

TASK TABLE 326

| Task ID 710 | HMI Object 712 | HMI Category 714 | Task Type 716 | Priority 718 | Deadline 720 | Execution Time 722 | Reliability 724 | Owner Device 726 | Owner Task 728 | Locked 730 | Feedback Timer 732 | Status 734 |
|---|---|---|---|---|---|---|---|---|---|---|---|---|
| 1 | Screen object | Visualize | Soft | 5 | 100ms | 50ms | Medium | Local | 1 | False | 0 | Running |
| 2 | Screen object | Handling | Soft | 5 | 30ms | 20ms | High | Local | 1 | False | 0 | Running |
| 3 | Alarm | Handling | Hard | 1 | 10ms | 10ms | High | Local | 2 | False | 0 | Running |
| 4 | Alarm | Visualize | Soft | 2 | 20ms | 10ms | Medium | Mobile1 | 2 | False | 10ms | Running |
| 5 | Alarm | Visualize | Soft | 2 | 20ms | 10ms | Medium | Mobile2 | 2 | False | 10ms | Running |
| 6 | Alarm | Visualize | Soft | 2 | 20ms | 10ms | Medium | Mobile3 | 2 | False | -5ms | Link |
| 7 | Report | Handling | Firm | 8 | 10h | 5h | Low | Cloud | 7 | False | 10m | Waiting |
| 8 | Report | Handling | Firm | 8 | 5h | 2h | Low | Mobile2 | 7 | False | 2m | Running |

*Fig. 7a*

RESOURCE TABLE 328

| Resource ID 752 | Name 754 | Type 756 | Performance 758 | Load 760 | Latency 762 | User ID 764 | Authorized 766 |
|---|---|---|---|---|---|---|---|
| 1 | Local | HMI Panel | Medium | 50% | 0 | - | True |
| 2 | Mobile1 | Mobile | High | 10% | 100ms | John | True |
| 3 | Mobile2 | Mobile | High | 90% | 110ms | Alice | True |
| 4 | Mobile3 | Mobile | High | 50% | 90ms | Bob | True |
| 5 | Cloud | Cloud | High | 5% | 400ms | - | True |

*Fig. 7b*

METHOD AND SYSTEM FOR OFFLOADING INDUSTRIAL TASKS IN A HUMAN-MACHINE INTERFACE PANEL TO OTHER DEVICES

CROSS-REFERENCE TO RELATED APPLICATIONS

This application claims priority to U.S. provisional application Ser. No. 61/908,918 filed Nov. 26, 2013, the disclosure of which is incorporated by reference herein in its entirety.

BACKGROUND OF THE INVENTION

1. Technical Field

The present invention relates to Human-Machine-Interaction (HMI) panels used in the industrial automation environment, and more particularly, to the offloading of tasks from the HMI to computing/communications devices such as smart phones and tablets.

2. Discussion of the Related Art

HMI panels are commonly used in the industrial automation environment, especially under harsh and extreme conditions, to visualize process values and to communicate with machines via industrial field buses. The HMI panel is the interface between a human operator and a machine that performs automation tasks. Panel technology, however, has evolved slowly while expectations regarding HMI tasks such as 3D visualization have grown exponentially. The gap continues to grow.

On the other hand, consumer mobile technologies (hardware and software) have been flourishing over the past decade. Smartphones and tablets present natural human input and output interfaces. Those devices typically having more powerful processors and graphics systems than most HMI panels. Smartphone and tablet capabilities can meet and even surpass the demands of many automation tasks.

The trend of cloud computing adds another layer of capability. The cloud provides even more online and offline computing power and accessibility.

SUMMARY OF THE INVENTION

In an exemplary embodiment of the present invention, there is provided a method for offloading human-machine-interaction tasks from a human-machine-interaction panel in an industrial automation system. Each human-machine-interaction task is classified into one of at least a high-priority task type and a second task type according to real-time computing requirements. By the human-machine-interaction panel, a schedule is computed for execution by the human-machine-interaction panel of the high-priority human-machine-interaction tasks. The high-priority human-machine-interaction tasks are then executed by the human-machine-interaction panel according to the schedule.

Offload destination resources that are available to the human-machine interaction panel are identified. The human-machine-interaction tasks of the second task type are then offloaded by the human-machine interaction panel to the offload destination resources for execution by the offload destination resources. The human-machine interaction panel periodically communicates with the offload destination resources to check a status of the offloaded human-machine-interaction tasks.

In one aspect of the disclosure, the human-machine-interaction tasks of the second task type comprise soft real-time tasks and firm real-time tasks. In that case, the offloading of the human-machine-interaction tasks of the second task type to the offload destination resources for execution by the offload destination resources may further include the following additional operations. A second schedule is computed for execution of the soft real-time tasks by intelligent communication devices of the offload destination resources, and the soft real-time tasks offloaded to the intelligent communication devices for execution by the intelligent communication devices according to the second schedule. A third schedule is computed for execution of the firm real-time tasks by a cloud computing environment of the offload destination resources, and the firm real-time tasks are offloaded for execution by the cloud computing environment according to the third schedule.

In another aspect of the disclosure, if the status of the offloaded human-machine-interaction tasks indicates that an offloaded human-machine-interaction task has been dropped, then the dropped offloaded human-machine-interaction task may be preempted by executing the task locally.

In another aspect of the invention, an HMI panel is provided having a processor; an input/output module connected to the processor and connectable for communication with the industrial automation equipment; a network communications module connected to the processor and connectable for communication with offload destination resources; and a non-transitory computer useable media having computer readable instructions stored thereon for execution by a processor to perform operations as described above.

BRIEF DESCRIPTION OF THE DRAWINGS

FIG. 7a illustrates a task table according to an exemplary embodiment of the present invention; FIG. 7b illustrates a resource table according to an exemplary embodiment of the present invention.

DETAILED DESCRIPTION OF EXEMPLARY EMBODIMENTS

Figure 1:
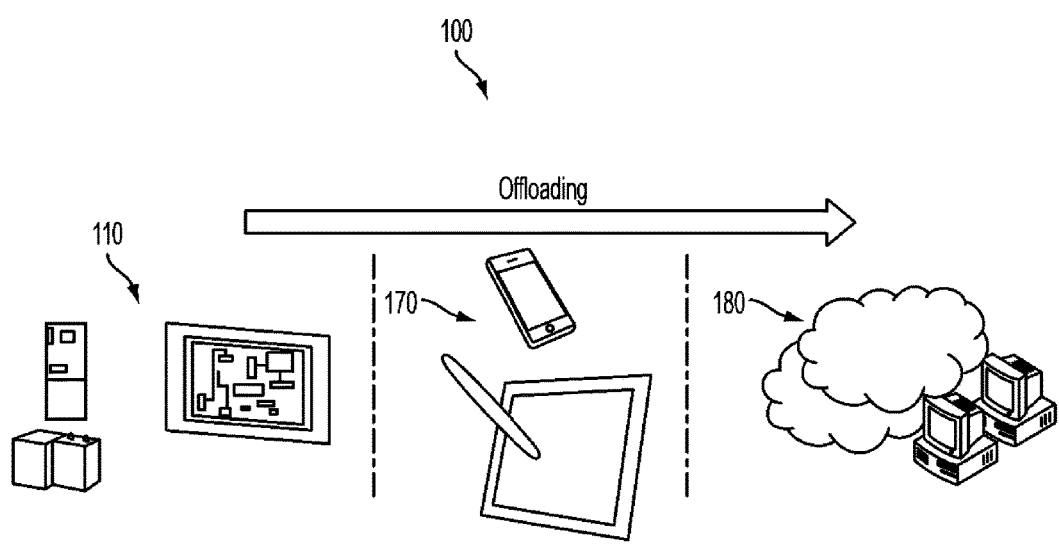
FIG. 1 is a diagram showing a three-tiered architecture according to an exemplary embodiment of the present invention.

An overview of an architecture in accordance with the present disclosure is shown in FIG. 1. In sum, the three-tier architecture 100 offloads HMI automation tasks from an HMI panel 110 to local mobile devices 170, and also through the local mobile devices 170 to a cloud-computing environment 180. The architecture 100 takes advantage of distributed computing and processing resources, and permits the use of new features such as touch inputs and HD resolutions that are not (or not yet) available in traditional HMI panel devices. The described architecture also provides for additional enhancements to automation systems such as operator collaboration.

The described system utilizes a scheduling algorithm based on characteristics of the HMI tasks. Those tasks are distributed intelligently among the local HMI panel 110, mobile devices 170 and the cloud 180, to best utilize the merits of each tier. The resulting system increases the performance and enhances the capabilities of an industrial HMI system.

Innovation in HMI panels is constrained by the real-time and safety requirements imposed by industrial applications. That has caused the computational capabilities and HMI features of HMI panels to lag behind those available in mobile phones and tablets. The presently disclosed system bridges that gap between real-time and safety-critical HMI panels and mobile devices, by extending the functionality and availability of mobile devices and the cloud to the HMI panel. That is accomplished while satisfying the environmental, communication, and real-time demands of a traditional HMI system. At the same time, the capabilities of the traditional HMI systems are enhanced using of the availability, computational capabilities, and advanced HMI features (touch, gesture, motion sensor inputs) found in mobile devices and the cloud.

Attempts have been made to utilize the advantages of mobile devices and the cloud in connection with HMI panel systems. For example, screen sharing techniques have used the Web to display on a mobile device a screen being displayed in the HMI panel. Those screen sharing implementations do not take full advantage of the advanced HMI functionality in mobile devices. Instead, the HMI panel screen is simply reproduced on the mobile device, and the user interacts directly with the HMI implementation running in the HMI panel and not in the mobile device. The tasks being performed by the HMI panel are not offloaded. For example, the computations that are performed in generating the screens are still performed locally by the HMI panel. The screen is simply shared over the network, and selections and clicks from the mobile device are simply relayed back to the HMI panel for processing.

Another prior technique is the use of a Web-based HMI wherein the HMI panel is replaced with a web-based HMI runtime system. Web-based HMIs, however, do not provide real-time guarantees. The execution is entirely dependent on Web technology (e.g., a Web browser is necessary). While some applications may take advantage of such non-real-time HMI, this idea cannot be generalized to industrial-strength HMI systems.

Cloud-based processing of HMI tasks has also been used to completely eliminate those tasks from the HMI system. Cloud-based processing requires a cloud interface implemented on a panel device. The tasks are statically assigned and planned a-priori and are owned by the cloud. The HMI panel does not have any control over those tasks.

The presently described system overcomes the above shortcomings by systematically classifying HMI tasks according to their nature and real-time requirements, and providing dynamic scheduling of tasks to devices to offload the computation and improve the overall performance of the HMI system. Computation is offloaded, rather than just sharing a screen on a remote device, allowing the mobile device or the cloud to make use of its local resources to best improve the user experience and computation of tasks locally in the device.

The presently described system does not replace the HMI panel. It instead uses the network, mobile devices, and the cloud to improve the overall performance of the system. The HMI panel is the master device and oversees the execution of the distributed/offloaded tasks at all times. By not eliminating the HMI panel, the system guarantees the real-time and safety-critical requirements of industrial HMI applications.

The presently described system dynamically reacts to the environment and detects new devices when they become available. It dynamically offloads/schedules tasks in the available resources, and prioritizes task offloading/scheduling based on the real-time requirements of the tasks. The system can therefore take full advantage of advanced HMI features in mobile devices such as gestures, multi-touch, sensor input, etc., as well as take advantage of the high availability and processing power of the cloud, while allowing the HMI panel to monitor and make decisions on the offloaded tasks.

The presently described system does not replace a Web interface. Instead, a Web interface is just one option of communication interface for offloading.

Traditional HMI panels are designed for use in an automation environment, which is frequently a harsh industrial environment that may include extreme temperatures, extreme vibration conditions, etc. HMI panels are special-purpose computers connected to machines (via programmable logic controllers (PLCs), input-output modules (I/Os), actuators, etc.) with a special industrial communication fieldbus such as Modbus, PROFINET or Profibus.

The panels, however, are less powerful and have fewer capabilities than most other modern computing devices. The panels also have a longer development cycle. For example, a typical HMI panel comes with only a few fixed screen sizes with different resolutions. It typically takes several years for an automation vendor to develop a next generation of panels that have larger screen sizes and higher resolutions.

HMI panel devices are expected to handle typical visualization and communication tasks, whose complexity has grown exponentially. 3D-graphics and modern input methods like touch and gestures are expected by the HMI panel operators, who use a smartphone daily. Sophisticated screen designs are the flagships of the automation plant.

In sum, HMI panels are not powerful enough, and do not evolve fast enough, to handle all those tasks, or to meet the expectations of users.

On the other hand, smartphones and tablets are consumer products that can be used as general-purpose computers and are getting more and more powerful every day. Every new generation of those devices provides more computing power, better graphics capabilities, memory, battery life, sensors, and interaction technologies such as voice, touch, multi-touch, etc. The devices are "always connected" and are ubiquitous in our society. Importantly, those devices make information available anywhere and anytime.

Mobile consumer devices are ideal for enhancing the HMI panel functionality by executing some of the HMI tasks in the mobile devices rather than in the centralized HMI panels. They extend the capabilities of HMI systems to new levels by allowing new human-machine interaction methods such as multi-touch, voice commands, 3D visualization, etc. These features have many benefits for the industrial automation domain where critical information can be presented to users in a more efficient manner than is possible with existing HMI panels. In this disclosure, the use of mobile devices and the cloud is proposed as an alternative for performing HMI tasks such as 3D rendering. Additionally, in accordance with the present disclosure, mobile devices enable HMI systems to have multiple users on multiple HMIs. That provides new collaboration opportunities between multiple users.

Cloud computing provides additional computing power and storage. It also has high availability. Offloading HMI tasks to the cloud adds value by providing shared data, by utilizing additional computing power and storage, and by adding new collaboration opportunities.

This disclosure proposes offloading HMI tasks from the HMI panel to mobile devices and then to the cloud. This enhances and extends the capabilities of the traditional HMI panel system to include features from mobile devices and the cloud.

A distributed architecture according to the present disclosure will now be described in some detail. Offloading HMI tasks to mobile devices extends the functionality of the traditional, centralized HMI systems where the users come to the HMI information, which is presented on a fixed screen in a factory. In the distributed architecture, information instead comes to the users. That paradigm shift requires a new HMI architecture where HMI tasks are processed according to their real-time requirements and also according to the cost of transmitting and receiving data from other devices. Formally, an HMI real-time system can be defined as follows: Consider a system comprising of a set of tasks, $T=\{\tau_1, \tau_2, \ldots, \tau_n\}$, where the worst case execution time of each task $\tau_i \in T$ is $C_i$. The system is said to be real-time if there exist at least one task $\tau_i \in T$ that falls into one of the following task types:

Hard real-time tasks (HRT): tasks that cannot miss any deadline, otherwise, the integrity of the system is jeopardized (e.g., human lives). That is, the execution of the task $\tau_i$ should be completed by a given deadline $D_i$; in other words, $C_i \leq D_i$. For example, machine control algorithms must be performed in real time to assure proper operation of the system.

Soft real-time tasks (SRT): tasks that could miss some deadlines and the system would still work correctly. However, missing some deadlines for SRT tasks will lead to paying penalties. A penalty function $P(\tau_i)$ is defined for the task. If $C_i \leq D_i$, the penalty function $P(\tau_i)=0$. Otherwise $P(\tau_i)>0$. The value of $P(\tau_i)$ is an increasing function of $C_i-D_i$. For example, a visualization algorithm that performs more slowly than expected may result in a penalty of degraded graphics being presented to the user.

Firm real-time tasks (FRT): tasks that result in a reward when their computation is completed before the deadline. The more ahead of schedule the tasks are completed, the more rewards are gained. A reward function $R(\tau_i)$ is defined for the task. If $C_i \leq D_i$, the reward function $R(\tau_i)=0$. Otherwise $R(\tau_i)>0$. The value of $R(\tau_i)$ is an increasing function of $D_i-C_i$. For example, if a report generation task is completed ahead of schedule, the reward of early reporting may result is a better user impression of the overall operation of the system.

Figure 2:
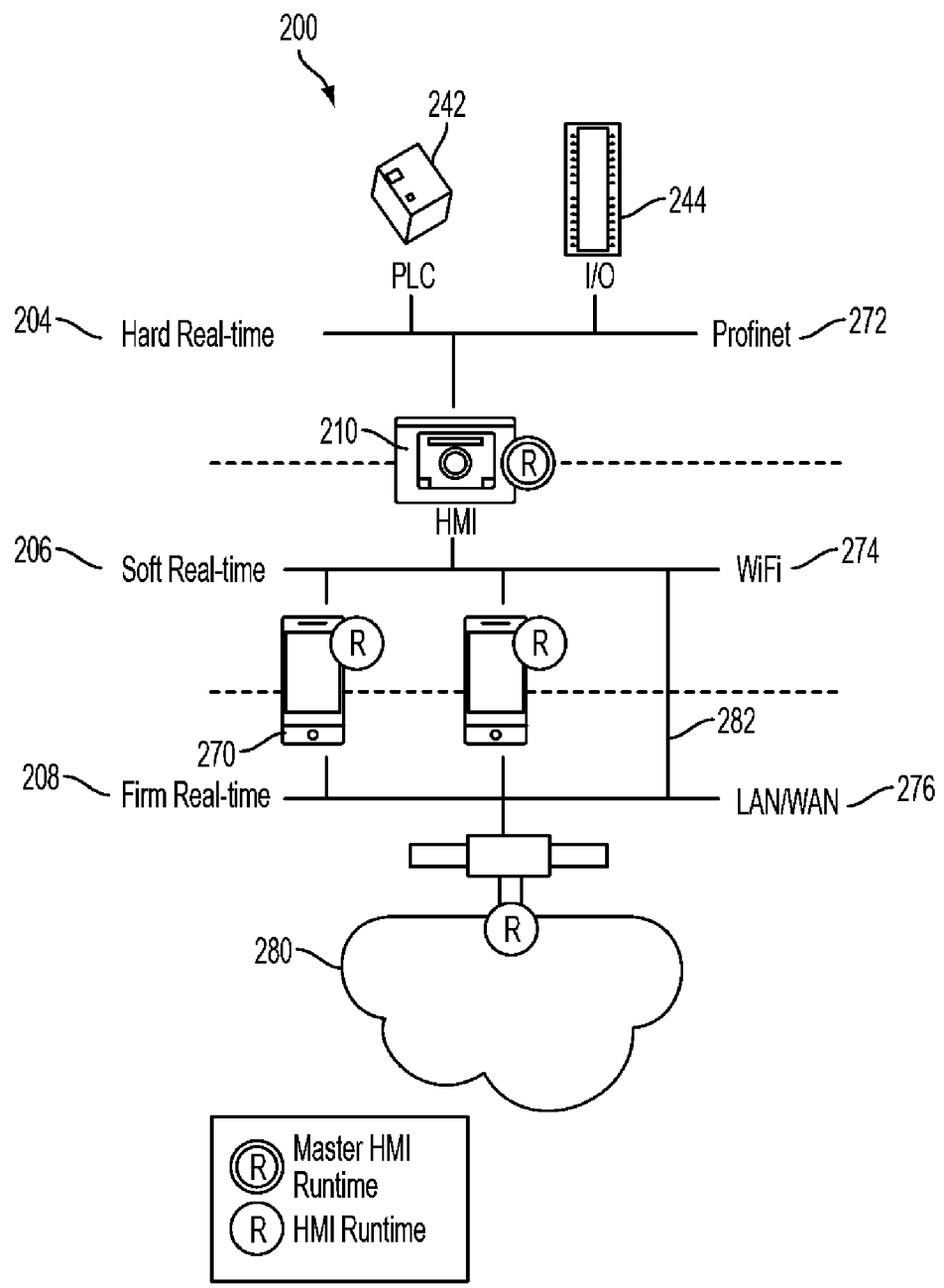
FIG. 2 is a system diagram showing the interconnection of HMI runtime instances according to an exemplary embodiment of the present invention.

An architecture 200, shown in FIG. 2, illustrates the classification and execution of HMI tasks according to their real-time requirements including hard real-time (HRT) tasks 204, soft real-time (SRT) tasks 206, and firm real-time (FRT) tasks 208. As shown in FIG. 2, an important component of the presently described architecture 200 remains the HMI panel 210, referred to as "Master HMI runtime," because it handles the HRT tasks 204 associated with field-level devices such as PLCs 242, I/Os 244, and a fieldbus network 272 (e.g. Profinet). Other real-time tasks such as SRT tasks 206 and FRT tasks 208 can be offloaded by the Master HMI runtime 210 to mobile devices 270 via a wireless network 274 such as a WiFi network, and eventually offloaded to the cloud 280 via a local or wide area network 276. Mobile devices 270 and the cloud 280 require a HMI runtime to execute the tasks offloaded to them by the system. The only difference between the Master HMI runtime in the HMI panel 210 and the HMI runtimes in the mobile devices 270 and the cloud 280 is that the Master HMI runtime has the highest authority and its scheduling decisions are final in the overall system. That architectural choice is based on the fact that the HMI panel 210 must remain in control of the overall system at all times. This mechanism also avoids deadlock and livelock, thus guaranteeing the deterministic execution required in HMI systems.

It is noted that as devices get farther from the field-level and HRT requirements, the reliability and therefore the real-time requirements are relaxed. For example, mobile devices 270 are connected to the HMI 210 through the WiFi network 274 are likely to have higher communication latency than devices connected to the HMI 210 using the Profinet network 272. Similarly, the cloud 280 connected to the mobile devices 270 through LAN/WAN network 276 is likely to have even higher communication latency than WiFi 274. In a preferred embodiment of the present disclosure, SRT tasks are therefore offloaded to mobile devices, and FRT tasks offloaded to the cloud.

The various runtime systems in the HMI panel 210, mobile devices 270 and cloud 280 communicate with each other and synchronize their work. In one embodiment, to reduce the communication bandwidth, only contiguous devices are allowed to talk to each other directly. In that example, the HMI panels 210 are able to communicate with field-level devices (e.g. PLCs 242, I/Os 244) and mobile devices 270, but cannot communicate directly with the HMI runtime in the cloud 280. Similarly, the HMI runtime in the mobile devices 270 can communicate with the HMI panel and the cloud 280, but not directly with the field-level devices 242, 244. That arrangement not only improves the network utilization but provides a mechanism for access control and security.

In alternative embodiments, communication is permitted between non-contiguous devices. For example, if the HMI panel 210 is cloud-enabled as depicted by the communication bus 282, the HMI panel is permitted to communicate with the cloud 280. In that arrangement, the master scheduler residing in the HMI panel 210 can communicate directly with all registered devices, including the cloud.

It is important to note that although FIG. 2 shows a single HMI panel 210, this invention disclosure is applicable in also to supervisory level SCADA systems, and any general purpose HMI systems in other domains.

Figure 3:
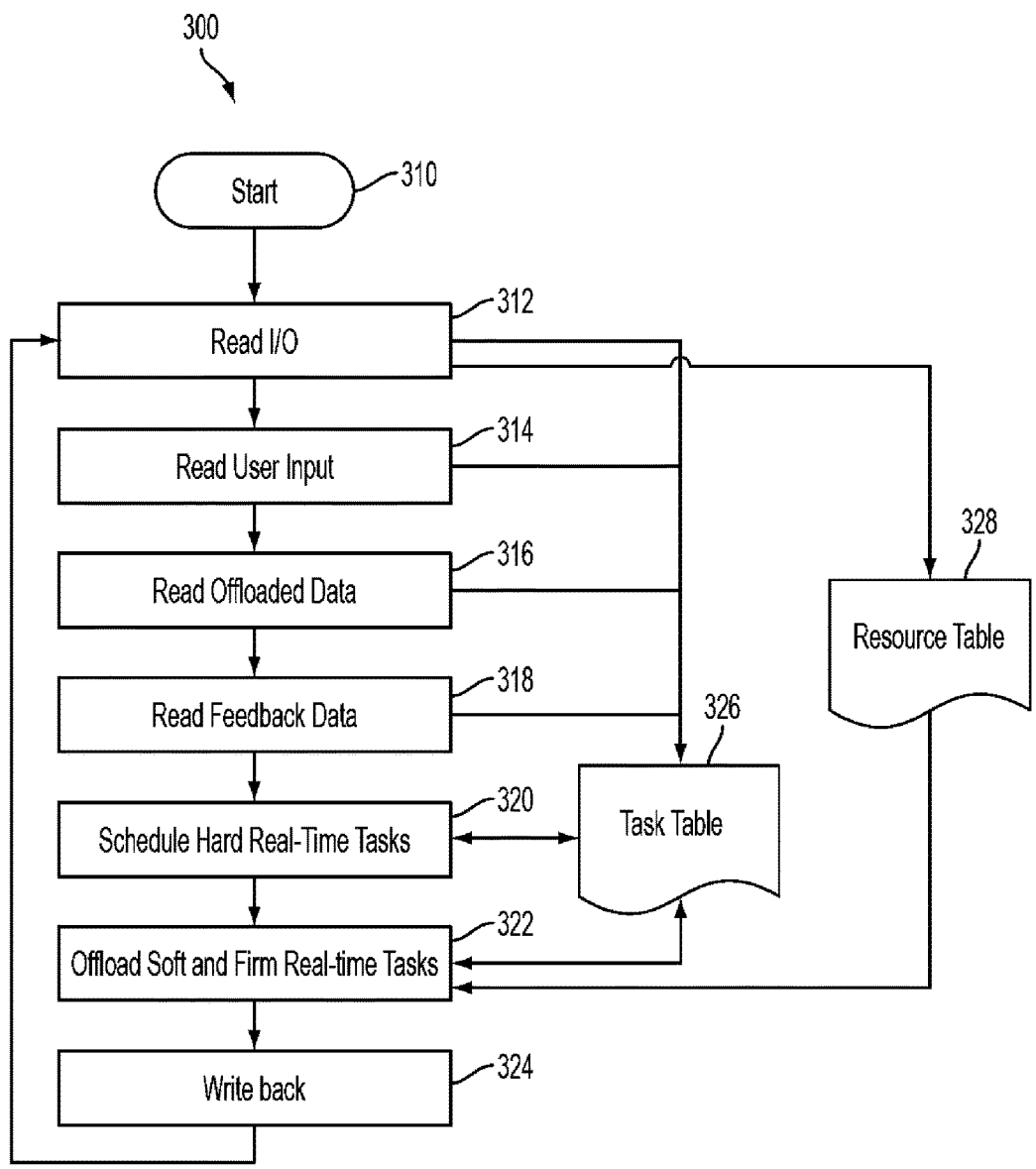
FIG. 3 is a flow chart showing an HMI runtime loop according to an exemplary embodiment of the present invention.

A HMI runtime loop 300 running on the master HMI runtime 210 (FIG. 2) is shown in FIG. 3. After an initial start-up 310, the first four actions are executed to read incoming data from different sources. First, the I/O data from the field-level devices is read at block 312, followed by user input data at block 314, offloaded data at block 316, and feedback data at block 318. Offloaded data refers to the data or requests from other offloading devices (in this case, there is none since the master HMI runtime is the master device). Feedback data refers to messages that monitor the status of offloaded tasks to determine whether the system is doing what it is supposed to do. Those four actions 312, 314, 316, 318 update the task table 326 to reflect the latest requests from the different sources. Specifically, the read I/O action 312 may update the task table 326 with new or existing HRT tasks received from the field-level devices. The read user input action 314 may update the task table 326 with new or existing tasks requested by a user-triggered event such as a push of a button. The read offloaded data action 316 may update the task table with new or existing tasks requested from other offloading devices (e.g. master or peer device). The read feedback data action 318 may update the task table 326 with new or existing tasks being executed in the mobile devices or the cloud. The scheduling loop 300 is designed to be generic so it can be used in devices at each tier. One or more of the four actions 312, 314, 316, 318 may be optional.

The schedule hard real-time tasks action 320 schedules HRT tasks within the Master HMI runtime according to their priority and real-time requirements. That information is obtained from the task table 326. Note that the schedule hard real-time tasks action 320 also updates the task table 326 to maintain an up-to-date state of the tasks in the overall system.

Similarly, the offload soft and firm real-time tasks action 322 schedules SRT and FRT tasks to mobile devices and the cloud according to their priority, status (obtained through the feedback data), and real-time requirements. That information is obtained from the task table 326. As with the schedule hard real-time tasks action 320, the offload soft and firm real-time tasks action 322 updates the task table 326 to maintain an up-to-date state of the tasks in the overall system, assign ownership of tasks, and establish the status monitoring policy for the offloaded tasks.

Finally, the write back action 324 prepares the HMI Panel for the execution of the next iteration.

The availability, subscription, and performance capabilities of mobile devices and the cloud are characterized through the resource table 328. Whenever a mobile device becomes available to the HMI system, it sends an I/O message to the HMI Panel runtime announcing its availability, requesting a subscription to the system and providing a performance characterization. At that stage, the HMI runtime can perform access control and security tasks to allow only authorized users and devices to be connected to the HMI system. After a trusted device is ready to receive offloaded tasks, an entry is added to the resource table 238. That information is used by the offload soft and firm real-time tasks action 322 to decide which devices are suitable to execute which tasks. The resource table 328 always contains at least one entry because the HMI panel itself is always a resource that can execute all tasks including HRT, SRT, and FRT tasks.

Figure 4:
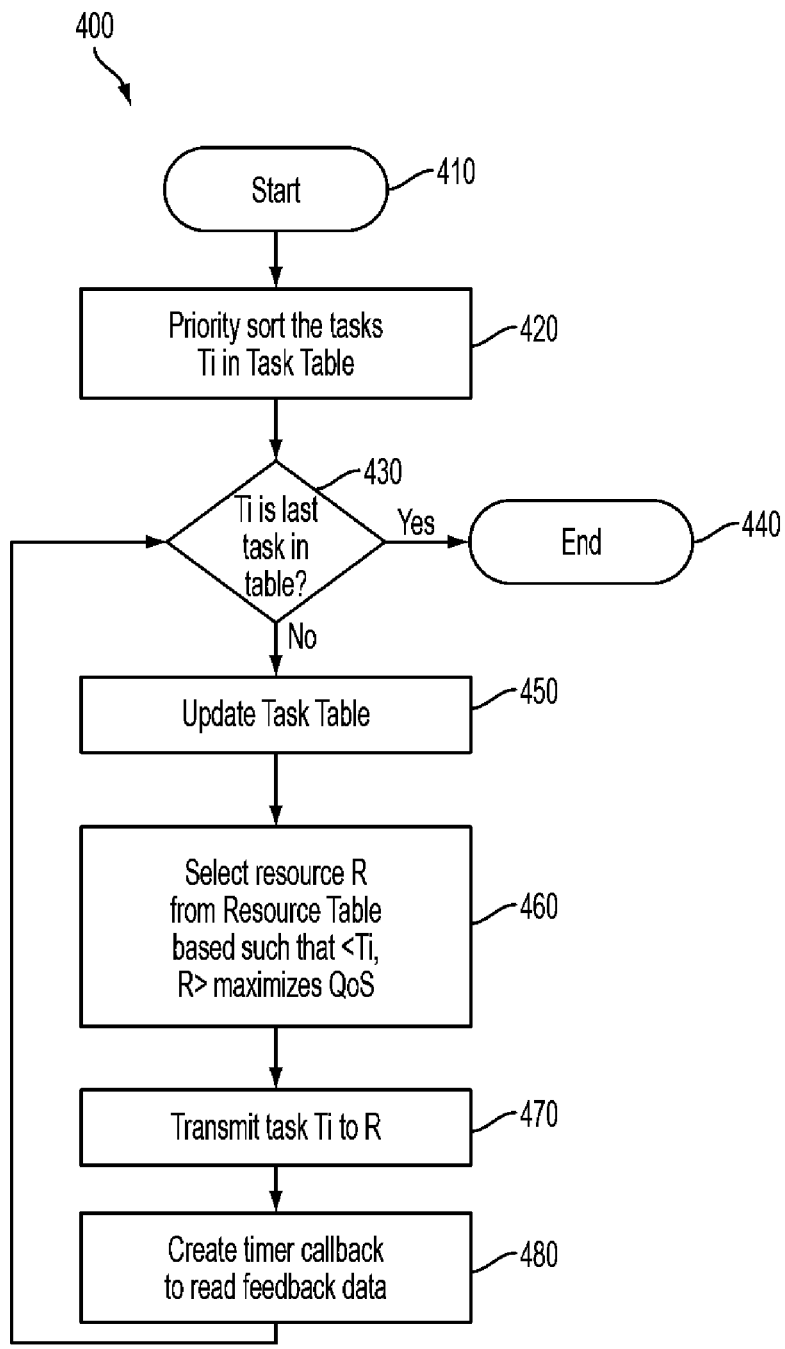
FIG. 4 is a flow chart showing task offload operations according to an exemplary embodiment of the present invention.

A more detailed discussion of the offload soft and firm real-time activity (or "scheduling activity") 322 of FIG. 3 follows with reference to the flow chart 400 of FIG. 4. After the activity is started at block 410, the tasks $T_i$, are priority sorted in the task table at action 420. Rather than sorting on every iteration, the table may be implemented in a data structure such as a priority queue or a balanced tree that maintains the tasks ordered according to their real-time requirements. Every task $T_i$ is then processed in the following manner:

The update task table action 450 marks $T_i$ as being processed in the task table. At action 460, a resource R is then selected from the resource table such that the execution of $T_i$ by R maximizes the Quality of Service (QoS). In that action, the scheduling activity 400 not only takes into account the performance characteristics of the available devices, but also takes into account the communication delays, the transmission of the task, and the loads in the devices. After a resource R has been selected, the transmit task $T_i$ to R action 470 is executed. That action marks task $T_i$ as ready for being dispatched to R. A dispatcher thread running in the HMI panel transmits the task $T_i$ to R. Finally, a timer callback is created at action 480 to check the status of the offloaded task periodically. The status information is available through the read feedback data action 318 in the main HMI loop 300 (FIG. 3). Execution of the scheduling activity continues until the last task Ti in the task table is processed (decision 430), then ends at block 440.

Figure 5:
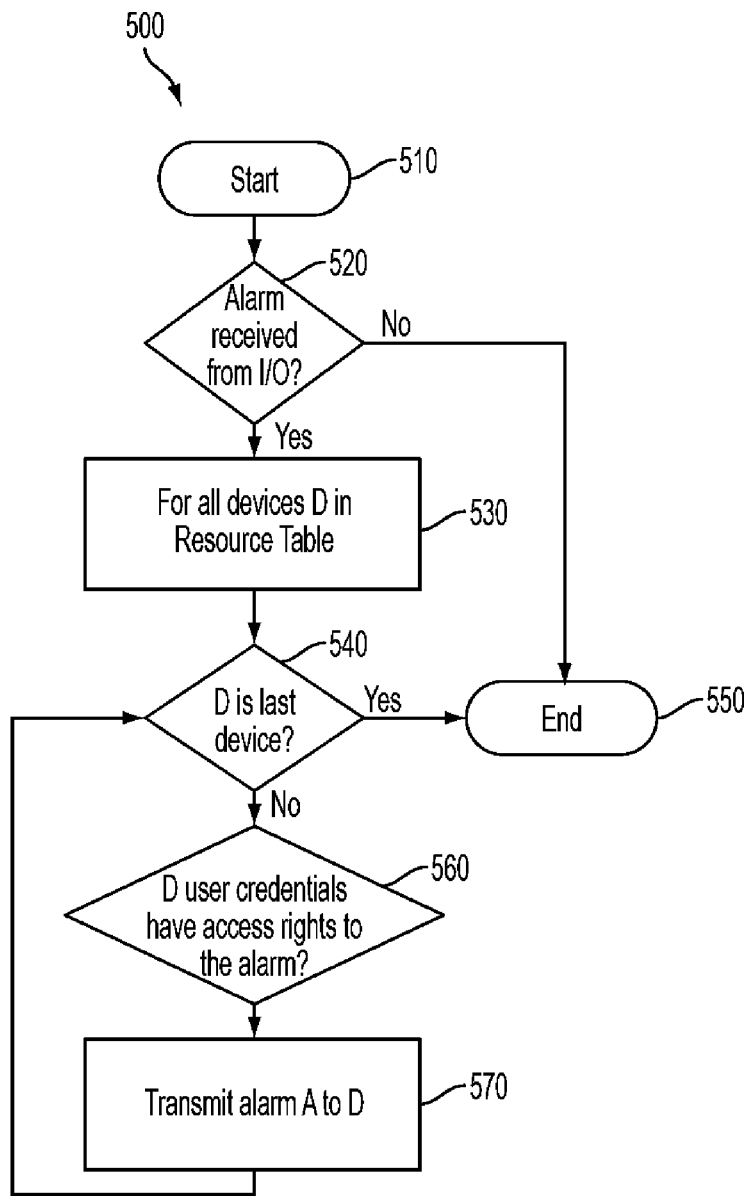
FIG. 5 is a flow chart showing alarm task dispatching operations according to an exemplary embodiment of the present invention.

The presently-described HMI architecture with multiple users requires new HRT tasks of delivering mission-critical alarm information to the mobile devices and the cloud. That is accomplished by an alarm dispatching activity 500 in the HMI panel when processing the local HRT tasks, as shown by the flow chart of FIG. 5. Once that activity begins at 510, whenever a mission-critical task such as an alarm is received from the I/O (decision 520), all devices D subscribed in the resource table (blocks 530, 540) are notified if D's user has correct access rights to the information concerning the alarm (decision 560). The transmission of the alarm A to devices D is performed using the task transmission action 570 of FIG. 5 with the help of dispatcher threads running in the HMI panel. The activity ends (block 550) after all devices have been processed.

Figure 6:
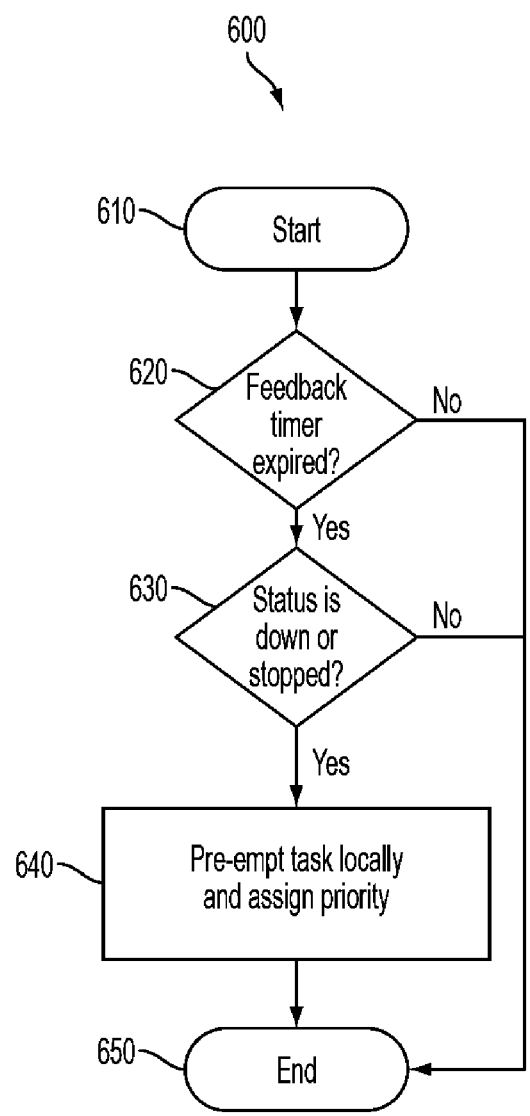
FIG. 6 is a flow chart showing offloaded task preemption operations according to an exemplary embodiment of the present invention.

An offloaded task preemption activity 600 is illustrated by the flow chart of FIG. 6. The activity 600 prevents offloaded tasks from not completing by pre-empting the task locally in the HMI panel if, for example, the connectivity to the resource where a task is being executed is lost, or the task is not making progress. Execution begins at block 610 and proceeds periodically based on a time checked at decision 620. The feedback callback associated with an offloaded task periodically checks, at decision block 630, whether the connectivity with the device was lost, or if the task is not making progress. In those cases, the task is pre-empted locally in the HMI panel at block 640 and assigned the priority according to its real-time requirements. The pre-emption of the task means that the partial execution of the task in the mobile device must be identified and discarded appropriately. A locally pre-empted task is executed from the beginning, or, if possible, execution is resumed from a state where its state is consistent and can lead to correct execution.

An example of the information available in the task table 326 (FIG. 3) is shown in FIG. 7a. The task ID field 710 represents a unique identifier that is assigned to each task in the system. HMI objects are shown in the field 712 and can be distinguished according to their function in a typical HMI system. In a typical system, those objects may include:

Screen object: represents elements displayed in a screen such as push buttons, labels, tags, counters, images, video, diagrams, etc.

Alarm: represents an event or a state which has occurred in the system, in the process or on the HMI device itself.

Tag: represents a variable with which the HMI runtime exchanges information with other devices. For example, a process value in a PLC can be represented as a tag in the HMI system.

Recipe: represents a collection of associated data such as configuration data or production data. The data may be transferred between HMI and PLC devices.

Report: represents a summary of data or events in the HMI system. The layout of the report can be specified in the HMI project.

Logging: represents storing the alarm events and process values in a log file.

Archiving: represents the storage of data or events in the HMI system.

Scripting: represents the execution of user-defined programs.

Analytics: represents the processing of data or events to find important information about the HMI system. For example, analyzing the sensor data may predict potential failures in the system from vibration history.

HMI objects can be categorized into one of four main categories, which appear in the task table 326 in the HMI category field 714:

Visualize: refers to the actual representation of the HMI task on a screen (e.g., a push-button).

Handling: refers to the actions associated with the different HMI tasks (e.g. an action that is triggered after a push-button is pressed by the user).

Logging: refers to the recording on disk of data or events related to the task.

Synchronization: refers to the messages exchanged by the devices to communicate their state with the environment (e.g. read-write values and alarm state changes to PLC).

As discussed above, HMI tasks can be classified as one of three types: Hard, Soft, and Firm. That classification is listed in the task type field 716. In general, the HMI objects listed above may be classified according to the following table:

| HMI OBJECT | CLASSIFICATION |
| --- | --- |
| Screen object | Soft |
| Alarm | Hard/soft |
| Tag | Hard |
| Recipe | Firm |
| Report | Firm |
| Logging | Firm |
| Archiving | Firm |
| Scripting | Soft |
| Analytics | Firm |

The examples shown in the above table demonstrate classification according to the criteria described above, wherein critical tasks that must be completed on time are classified as "hard," while tasks with flexible completion times are classified as "soft" or "firm." In one example from the task table of FIG. 7a, task 3, the handling of an alarm is classified as a "hard" task because the assigned deadline must be met for the integrity of the system to be preserved. That task is performed locally by the HMI panel to maintain control by the HMI panel. In another example, task 7 is the handling of a report. That task is classified as a "firm" task because, if finished early, there is a reward in that a user's perception of the overall system performance is enhanced. Task 7 is offloaded to the cloud. If the HMI panel is cloud-enabled as illustrated by the connection 282 of FIG. 2, then task 7 remains visible to the master scheduler residing in the HMI panel, but is executed by the cloud. Alternatively, task 7 may be offloaded by the HMI panel to a mobile device that subsequently offloads it to the cloud.

The priority field 718 contains a positive integer between 1 and 10 that determines the priority for executing a task in the system. For example, a high priority task with priority=1 is typically assigned to HRT tasks such as Alarms, and a low priority task with priority=10 is typically assigned to FRT tasks such as Archiving.

The deadline field 720 contains a time that specifies when the task is expected to complete.

The execution time field 722 contains the worst case execution time of the task.

Reliability is stored in a reliability field 724 and is a metric that defines the probability of a task completing on time. Reliability can be High, Medium, or Low. For example, a HRT task executed in the HMI panel will likely have a high reliability. A SRT task executed in a mobile device will likely have a medium reliability due to the latency in the network, the possibility of a disconnection, etc. A FRT task executed in the cloud will likely have a low reliability due to the latency in the network, the load in the cloud, etc.

The owner device for a particular task determines which device is in charge of executing the task. The owner device is listed in the owner device field 726 and can be Local (HMI Panel), a Mobile device (e.g. Mobile1, Mobile2, Mobile3), or the Cloud. The owner task field 728 stores the identification of each task used by the owner device.

The locked field 730 contains a Boolean value that is true when the scheduler is making a scheduling/offloading decision on the task. That value is used to prevent other threads from updating the Task Table and creating a memory inconsistency problem or a race condition.

A feedback timer field 732 specifies the time remaining to check the status of offloaded tasks. A status field 734 specifies the last known status of the task. Examples of values of the status field include:

Running: the task is executing normally.
Stopped: the task was stopped.
Completed: the task completed.
Waiting: the task is waiting.
Blocked: the task is blocked.

Link down: the connection to the remote device (e.g. mobile or cloud) was lost.

Requesting ownership: the device is requesting ownership of the task.

An example of a resource table 328 (FIG. 3) is shown in FIG. 7b. The resource ID field 752 contains unique identifiers assigned to the devices in the HMI system. The name field 754 lists an alias for the device.

Data contained in the type field 756 identifies whether the device is the HMI panel, a mobile device, or the cloud. The performance field 758 specifies the capabilities of the device in terms of its data processing capabilities. The load field 760 contains a percentage representing the amount of work being executed by the device. This value is kept up to date with synchronization messages between the mobile devices/cloud and the HMI panel.

A communication latency to the device is represented in the latency field 762. The user ID field 764 lists identities of users logged to the HMI system. The authorized field 766 contains a Boolean value that it is true when the device is authorized to be part of the HMI system and false when the device is not authorized or not known.

Figure 8:
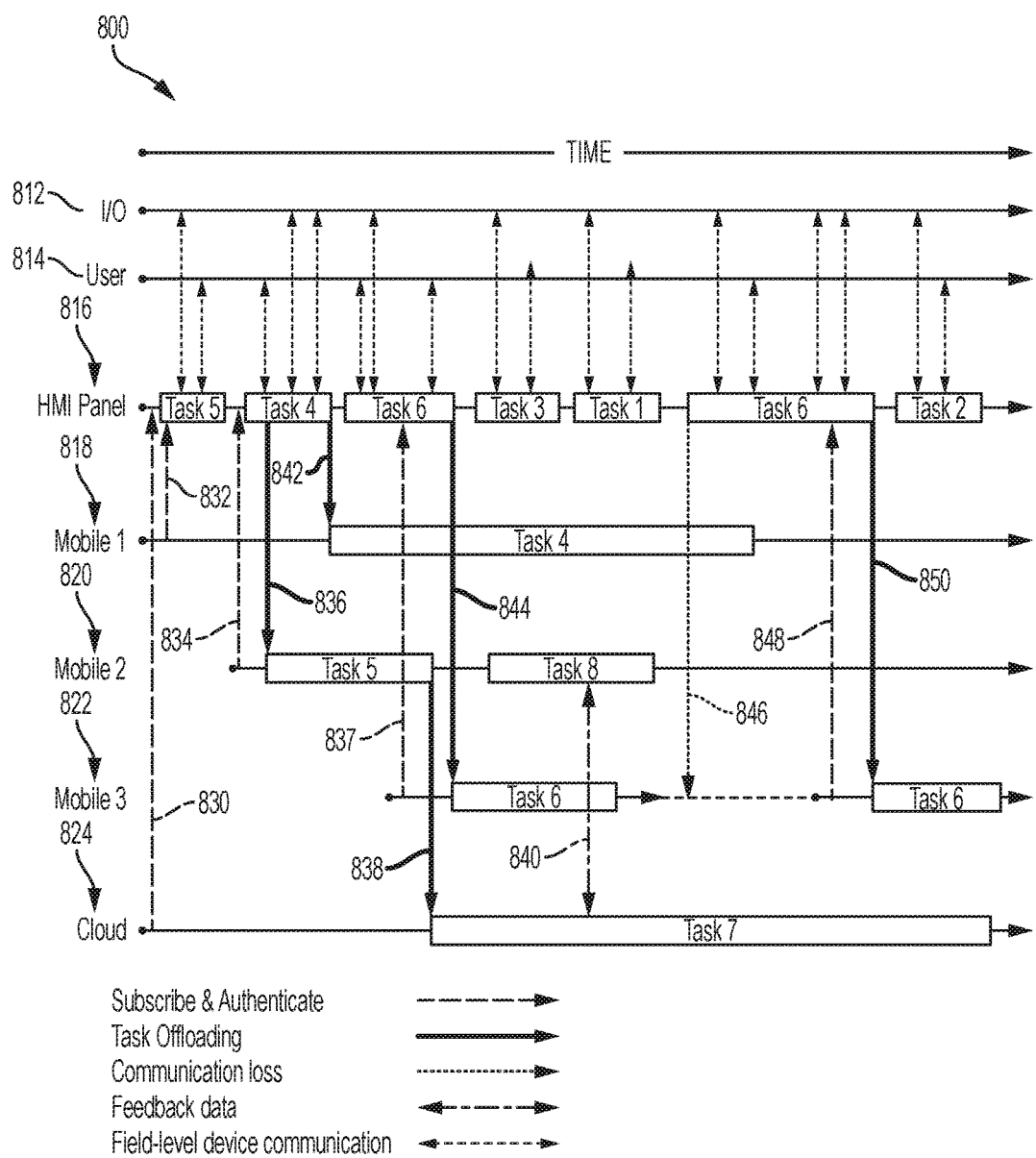
FIG. 8 is a time line illustrating an offloading method in accordance with one embodiment of the invention.

An offloading example using the tasks 1 through 8 listed in FIG. 7a is represented by the timeline 800 of FIG. 8. Note that the HMI panel 816 is frequently serving the requests and field-level communication from the user 814 and I/O 812. Starting from the left, the cloud 824 and mobile 1 device 818 subscribe and authenticate with the HMI panel, as shown by the arrows 830, 832. The first task executed in the HMI panel 816 is task 5. Task 5 is then suspended by the HMI panel to receive a subscription request 834 from the mobile 2 device 820. After the mobile 2 device 820 has been subscribed and added to the resource table, the HMI panel 816 offloads task 5 (shown by arrow 836) from the HMI Panel to the Mobile 2 device 820. Task 7 is a FRT task that can be offloaded to the cloud 824 by mobile 2 device 820 (arrow 838). As task 7 is executed on the cloud 824, it regularly updates task 8 (arrow 840) executing in mobile 2 device 820, task 8 being dependent on task 7. Similarly, task 4 is offloaded (arrow 842) from the HMI panel 816 to mobile 1 device 818.

In the case of task 6, after mobile 3 device 822 is subscribed and added to the resource table (arrow 837), the HMI Panel 816 offloads task 6 to the mobile 3 device 822 (arrow 844). In this example, however, the HMI Panel loses connectivity with the mobile 3 device (arrow 846) and the HMI Panel needs to preempt task 6 in the HMI Panel itself to guarantee the integrity of the system. Once the mobile 3 device 822 is again available and subscribes to the HMI Panel (arrow 848), then Task 6 is offloaded again (arrow 850) to the mobile 3 device 822.

Note that HRT tasks Task 1, Task 2, and Task 3 are executed in the HMI panel. Those tasks are retained by the HMI panel rather than offloaded, to avoid the effects of connectivity losses and other problems beyond the control of the HMI panel. That arrangement permits the offloading of some tasks to mobile devices and the cloud while satisfying the environmental, communication, safety and real-time demands of a traditional HMI system.

The timeline 800 of FIG. 8 illustrates a system in which the HMI panel 816 is not cloud-enabled. Specifically, while the HMI panel 816 has direct connections with the mobile devices 818, 820, 822, it does not have a direct connection with the cloud 824 and therefore does not communicate directly with the cloud. That arrangement reduces the communication bandwidth, improves the network utilization and provides a mechanism for access control and security.

Figure 9:
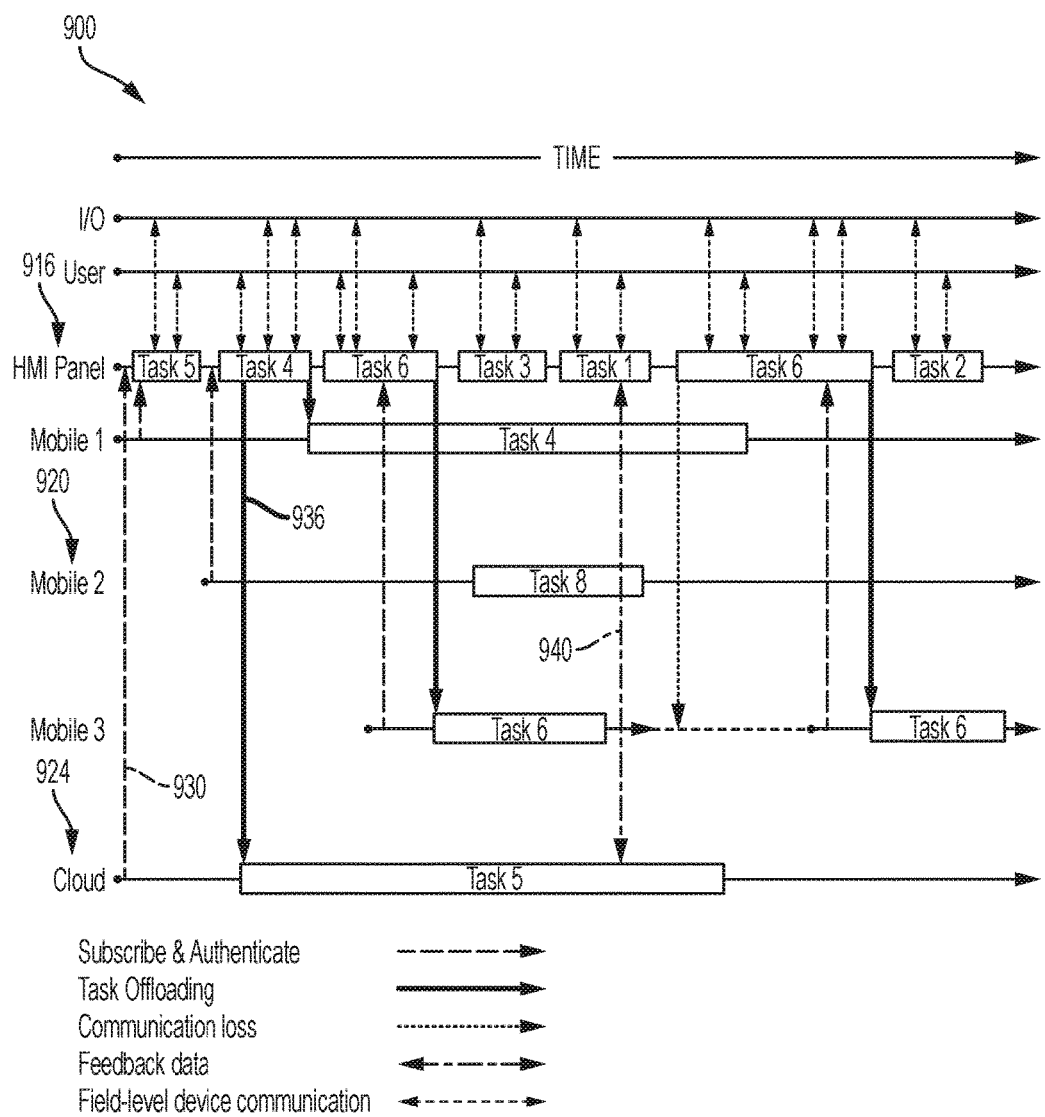
FIG. 9 is a time line illustrating an offloading method in accordance with another embodiment of the invention.

A timeline 900, shown in FIG. 9, illustrates an alternative embodiment wherein communication is permitted between non-contiguous devices. In this embodiment, the HMI panel 916 is cloud-enabled, permitting the cloud 924 to be subscribed and authenticated (arrow 930) to the HMI panel 916.

The HMI panel 916 is then capable of directly offloading (arrow 936) task 5 for execution in the cloud 924. Feedback data from the cloud 924 is provided directly to the HMI panel 916 (arrow 940), enabling the HMI panel to monitor the progress of task 5 as it is executed in the cloud 924, and to utilize updates from task 5 in executing task 1.

While the arrangement of FIG. 9 may require increased bandwidth and network utilization, as well as more sophisticated access control and security measures, the arrangement has the advantage of faster and more direct access to the cloud, which offers effectively unlimited computing power. Data analysis that formerly had to be scheduled by the HMI panel on local workstations is performed faster and with greater availability in the cloud. The tasks performed by the cloud are furthermore more accessible to users that are remote from the HMI panel. For example, data from tasks executed by the cloud are available to high level programs, such as those used to determine the logistics of production for the processes controlled by the HMI panel.

To demonstrate the offloading concept, a demonstration Automation Web Framework (AWF) has been implemented by the inventors using Web technology to offload some HMI tasks (e.g. screen objects, alarming) from a traditional HMI system (a Siemens SIMATIC WinCC) to a Web browser on the mobile device such as iPhone and iPad. The prototype uses an existing WinCC Turbine Generator Monitor HMI Project of WinCC.

Figure 10:
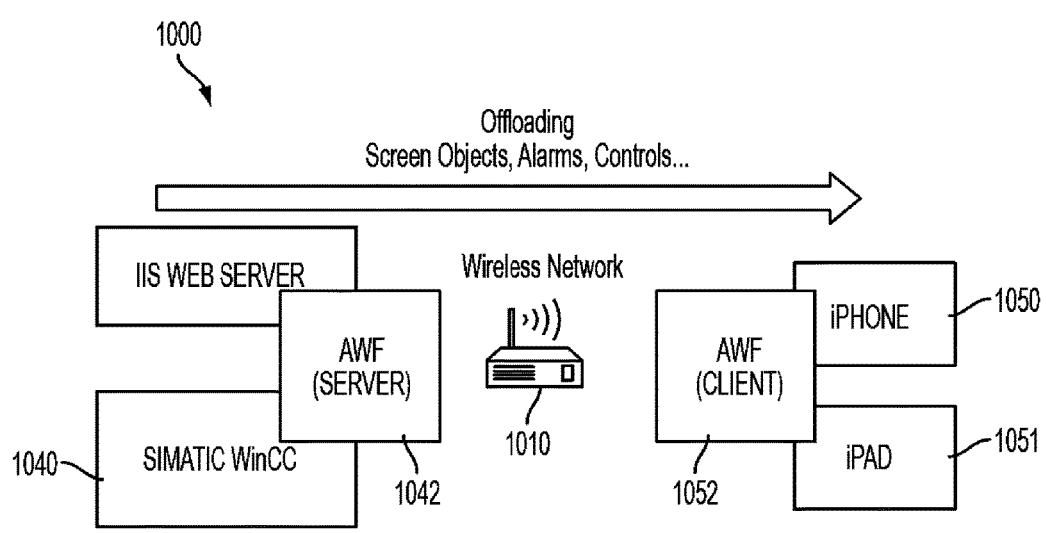
FIG. 10 is a block diagram showing equipment used in a demonstration of one embodiment of the invention.

As shown by the architectural diagram 1000 of FIG. 10, Web technology is used as the communication technology between the local HMI system (e.g. HMI Panel 1040) and mobile devices 1050, 1051. The Web technology is well supported in the mobile devices 1050, 1051 which include Web clients 1052, and is also well supported in the HMI Panel 1040, which contains a web server 1042. The demonstration system utilized a WiFi network 1010 for physical connections.

Figure 11A:
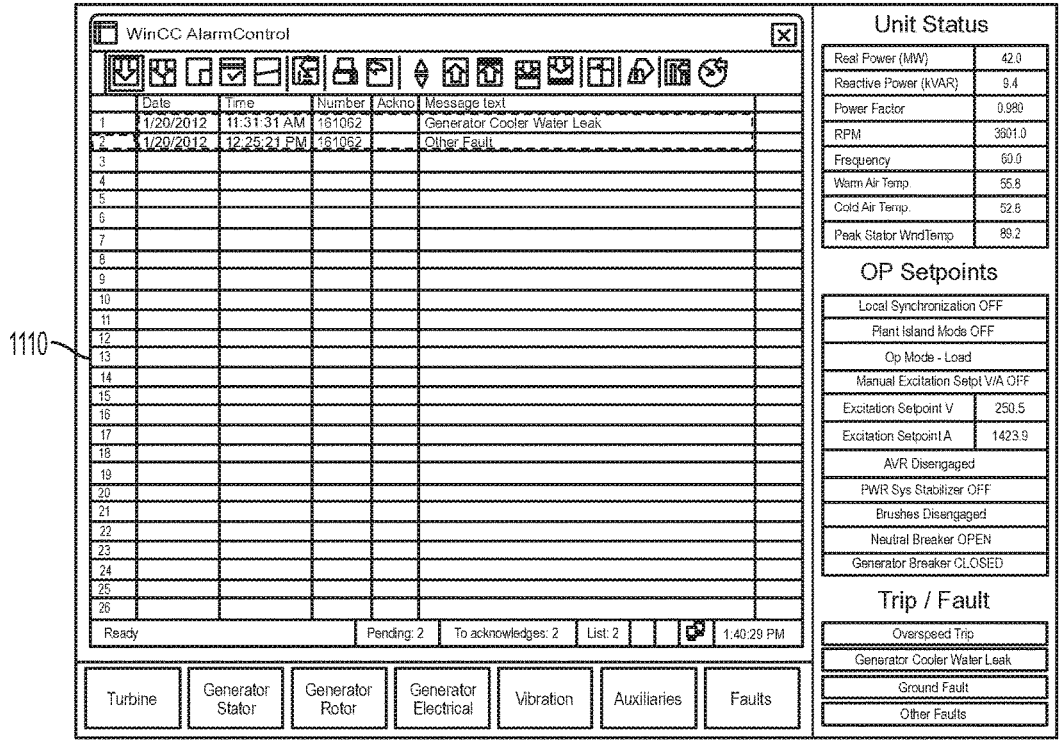
FIG. 11a is a screenshot of an HMI panel display during execution of an alarm control task.
Figure 11B:
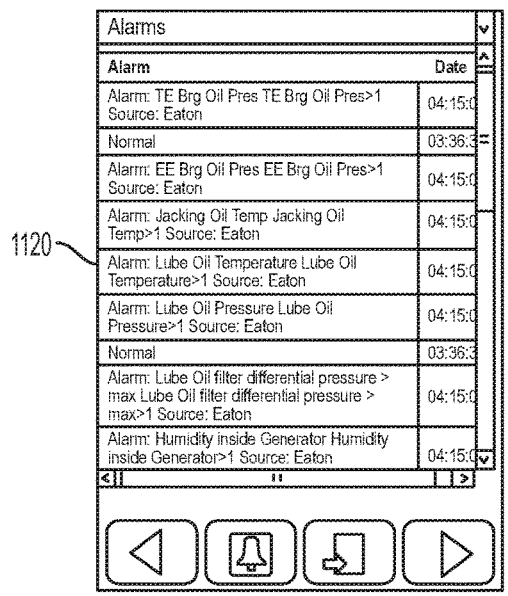
FIG. 11b is a screenshot of a mobile device display during execution of an alarm notification task offloaded from an HMI panel in accordance with one embodiment of the invention.

The demonstration system 1000 was used to demonstrate the offloading of an alarm control in WinCC to a Mobile device. A screenshot 1110 shown in FIG. 11a illustrates a traditional alarm control as presented by an HMI panel. The screenshot 1120 shown in FIG. 11b illustrates a mobile device screen during execution by the mobile device of an alarm notification task that was offloaded by the HMI panel to the mobile device.

Figure 12A:
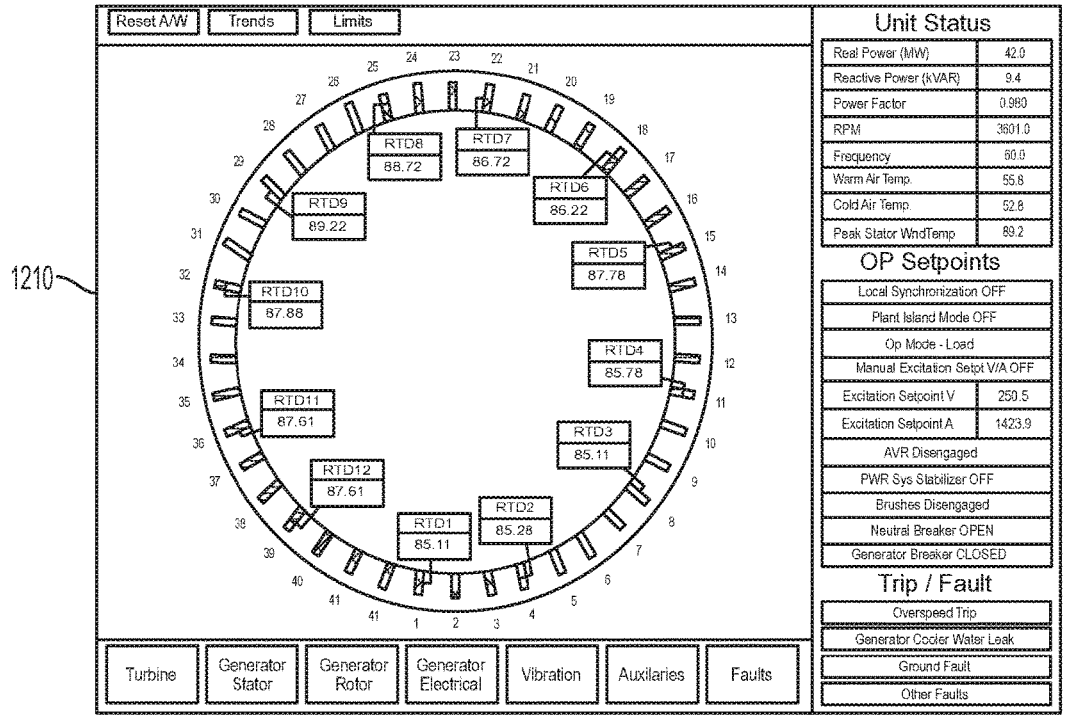
FIG. 12a is a screenshot of an HMI panel display showing screen objects.
Figure 12B:
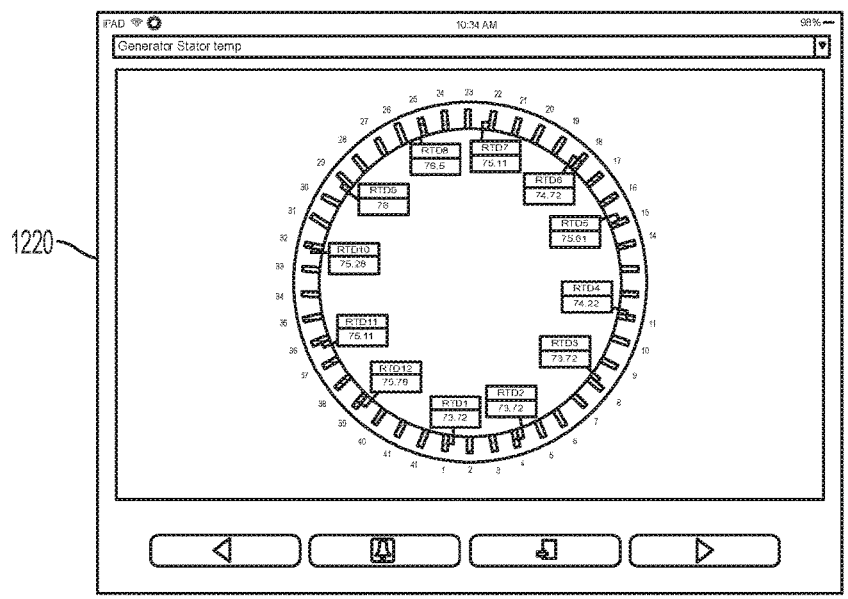
FIG. 12b is a screenshot of a mobile device display showing screen objects offloaded from an HMI panel to the mobile device in accordance with one embodiment of the invention.

The demonstration system 1000 shown in FIG. 10 was similarly used to demonstrate the offloading of data analysis and visualization tasks from WinCC to a mobile device. A screenshot 1210 shown in FIG. 12a illustrates multiple screen objects including pictures, I/O fields and trend control, which were generated in WinCC and presented by an HMI panel. The screenshot 1220 shown in FIG. 12b illustrates a mobile tablet screen showing screen objects generated by the mobile tablet during execution of data analysis and visualization tasks that were offloaded by the HMI panel to the mobile tablet.

Figure 13A:
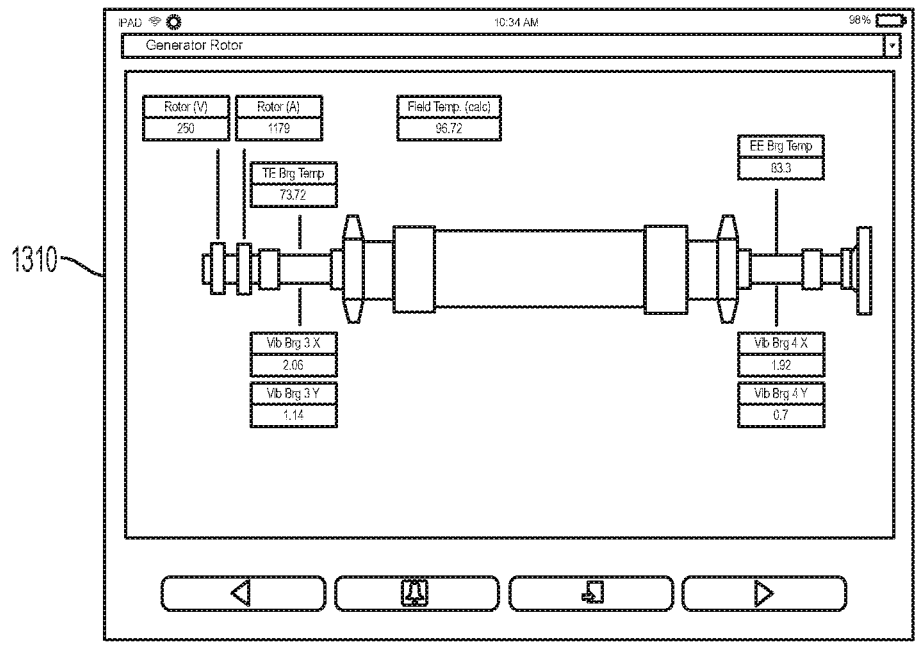
FIG. 13a is a screenshot of an HMI panel display showing additional screen objects.
Figure 13B:
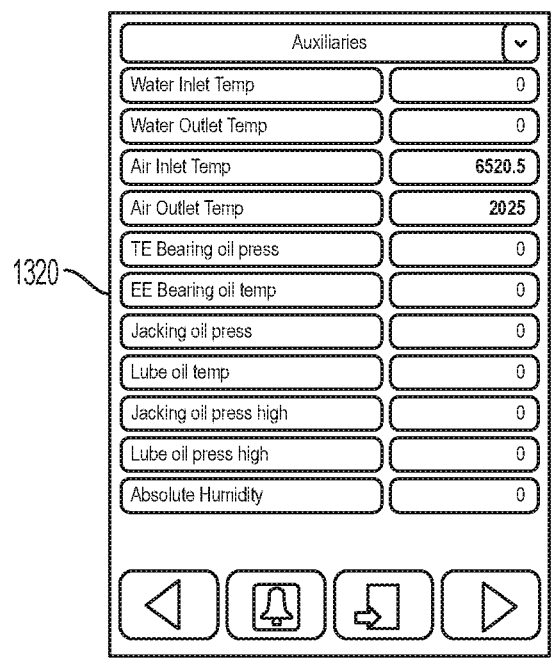
FIG. 13b is a screenshot of a mobile device display showing additional screen objects offloaded from an HMI panel to the mobile device in accordance with one embodiment of the invention.

FIGS. 13a and 13b illustrate another example in which data analysis and visualization tasks were downloaded from an HMI panel to a mobile device. A screenshot 1310 shown in FIG. 13a illustrates multiple screen objects that were generated in WinCC and presented by an HMI panel. The screenshot 1320 shown in FIG. 13b illustrates a mobile device screen showing screen objects offloaded to the mobile device, including I/O fields and tags.

Figure 14:
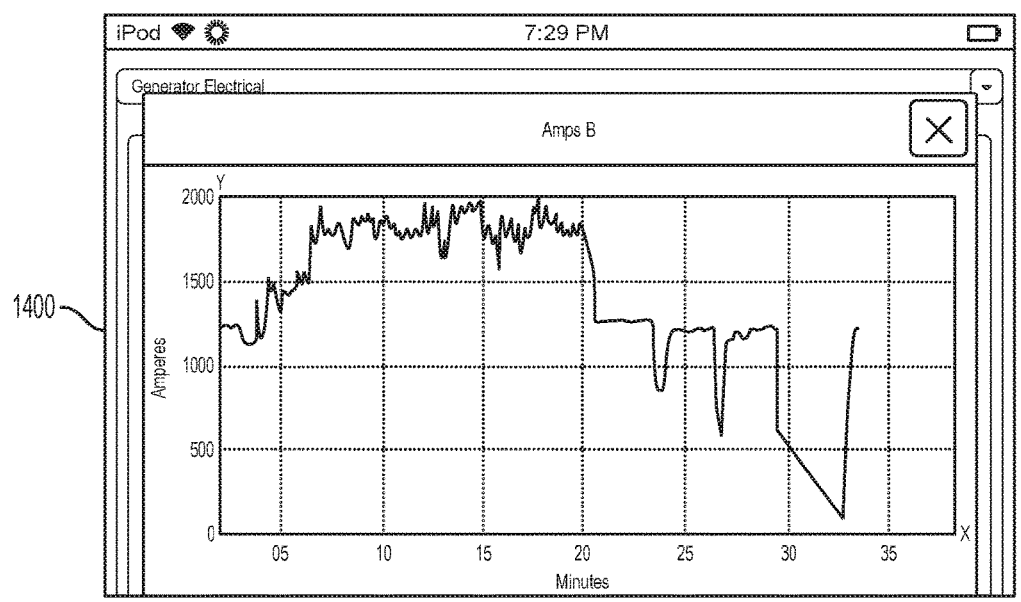
FIG. 14 is a screenshot of a mobile device performing a trend control visualization task offloaded from an HMI panel.

FIG. 14 shows a screenshot 1400 depicting a visualization of trend control shown on a mobile device. The trend control task was offloaded to the cloud and the visualization was offloaded to the mobile device.

Figure 15:
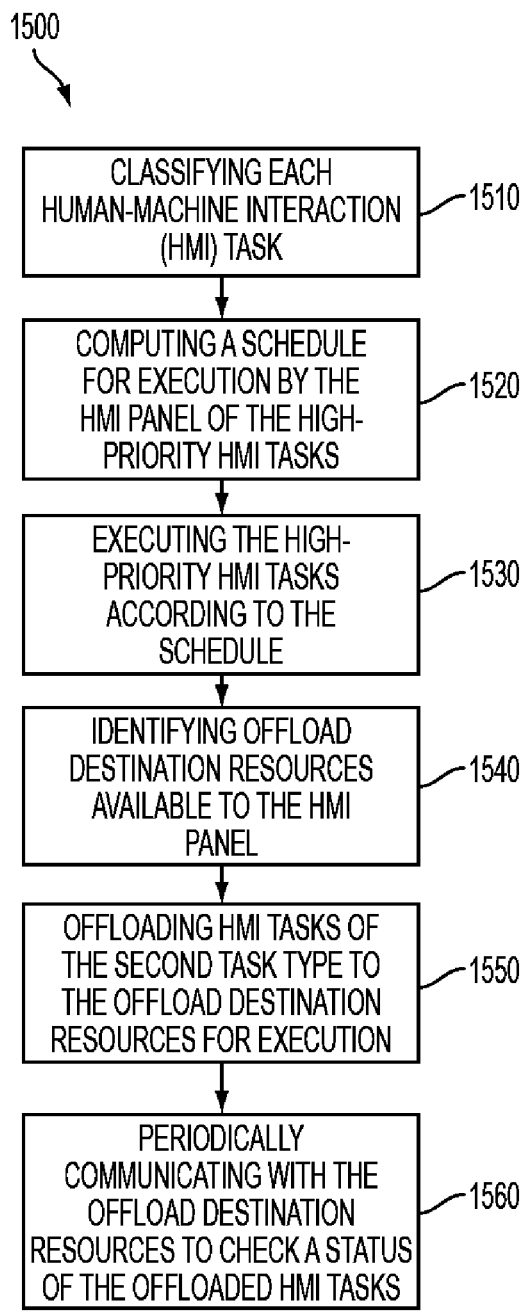
FIG. 15 is a flowchart showing a method according to one embodiment of the invention.

A method in accordance with the present disclosure for offloading HMI tasks from a HMI panel in an industrial automation system is illustrated by the flow chart 1500 of FIG. 15. Each HMI task is initially classified 1510 into one of at least a high-priority task type and a second task type according to real-time computing requirements.

A schedule is then computed 1520 by the HMI panel for execution by the HMI panel of the high-priority HMI tasks, and the high-priority HMI tasks are executed 1530 by the HMI panel according to the schedule.

Offload destination resources that are available to the HMI panel are identified at 1540. The HMI tasks of the second task type are then offloaded 1550 by the HMI panel to the offload destination resources for execution by the offload destination resources. The HMI panel periodically communicates 1560 with the offload destination resources to check a status of the offloaded HMI tasks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. A computer readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable medium may be any tangible, non-transitory medium that can contain or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 16:
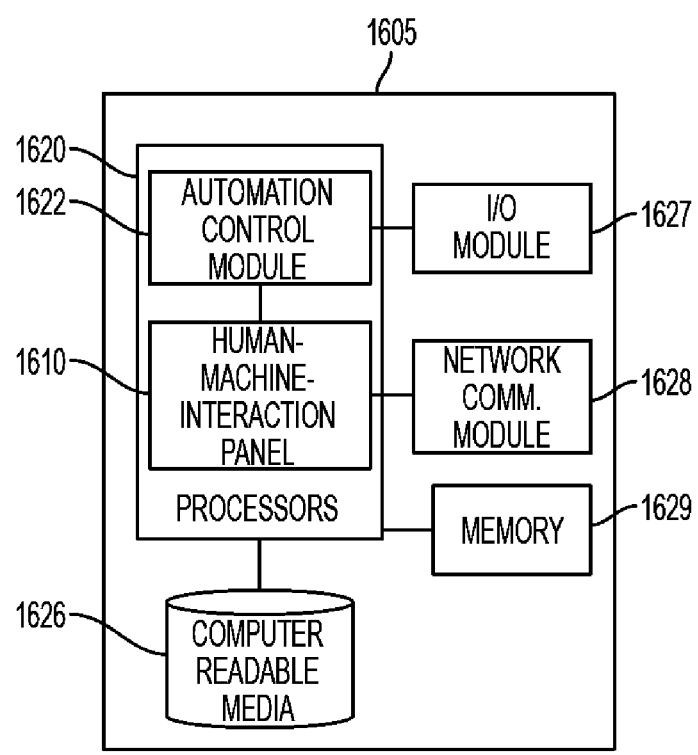
FIG. 16 is a schematic diagram showing an apparatus in accordance with one embodiment of the invention.

Referring now to FIG. 16, according to an exemplary embodiment of the present invention, a computer system 1605 can comprise, inter alia, one or more central processing units or processors (CPUs) 1620, a memory 1629, an input/output (I/O) interface module 1627 and a network communication interface module 1628. The CPUs 1620 execute one or more program modules that perform specific tasks and interact with the environment of the computer system 1605. One such module is an automation control module 1622 that oversees control of the automation environment. The automation control module 1622 connects to sensors, actuators and other controllers via an I/O communications module 1627 and automation-hardened networks such as Modbus, PROFINET or Profibus.

Another module residing on the CPUs 1620 is a human-machine-interaction (HMI) module 1610 that manages interactions between the human users and the automation environment. The HMI module 1610 is generally coupled to a display and various input devices such as a mouse and keyboard (not shown). In addition, the HMI module of the present disclosure is coupled to a network communications module 1628 that supports communications with a wireless local area network with as a WiFi network, as well as with wide area networks such as cellular wireless networks or the Internet, for communication with remote mobile devices and the cloud.

The memory 1629 can include RAM, ROM, disk drive, tape drive, etc., or a combination thereof. Exemplary embodiments of present invention may be implemented as a routine stored in memory 1629 or other non-transitory computer-readable storage media 1626 and executed by the CPUs 1620 to control an industrial automation system. As such, the computer system 1605 is a general-purpose computer system that becomes a specific purpose computer system when performing methods of the present disclosure.

The computer system 1605 also includes an operating system and micro-instruction code. The various processes and functions described herein may either be part of the micro-instruction code or part of the application program (or a combination thereof) which is executed via the operating system. In addition, various other peripheral devices may be connected to the computer system 1605 such as an additional data storage device and a printing device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. It is to be understood that various modifications will be implemented by those skilled in the art, without departing from the scope and spirit of the disclosure.

What is claimed is:

1. A method for offloading human-machine-interaction tasks from a human-machine-interaction (HMI) panel in an industrial automation system, the method comprising:
   in the HMI panel implemented as a special purpose computer connected to machines of the industrial automation system by a special industry communication field bus:
   classifying each human-machine-interaction task into one of at least a first task type and a second task type comprising soft real-time tasks having a penalty for finishing after a deadline and firm real-time tasks having a reward for finishing before the deadline wherein the penalty is an increasing function of a time by which the execution time exceeds the deadline, wherein the first task type and the second task type are classified according to real-time computing requirements;
   by the human-machine-interaction panel, computing a schedule for execution by the human-machine-interaction panel of the first type of human-machine-interaction tasks of the industrial automation system;
   by the human-machine-interaction panel, executing the first human-machine-interaction tasks of the industrial automation system according to the schedule;
   identifying offload destination resources available to the human-machine interaction panel, wherein the offload destination resources are separate from the human-machine-interaction panel;
   by the human-machine interaction panel, offloading the human-machine-interaction tasks of the industrial automation system of the second task type to the offload destination resources for execution by the offload destination resources; and
   periodically communicating with the offload destination resources to check a status of the offloaded human-machine-interaction tasks of the industrial automation system, wherein all human-machine interaction tasks performed locally or remote to the human-machine interface panel are managed by the human-machine interface panel.

2. A method as in claim 1, wherein classifying the plurality of human-machine-interaction tasks is further according to data transmission costs between the human-machine-interaction panel and the offload destination resources available to the human-machine-interaction panel.

3. A method as in claim 1, wherein the human-machine-interaction tasks of the first task type are hard real-time tasks that have a highest priority of the human-machine-interaction tasks.

4. A method as in claim 1, wherein the reward for finishing before the deadline is an increasing function of a time by which an execution time precedes the deadline.

5. A method as in claim 1, wherein the offload destination resources comprise intelligent communication devices and a cloud computing environment; and
   wherein offloading the human-machine-interaction tasks of the industrial automation system of the second task type to the offload destination resources for execution by the offload destination resources further comprises:
   by the human-machine-interaction panel, computing a second schedule for execution of the soft real-time tasks of the industrial automation system by the intelligent communication devices;

by the human-machine-interaction panel, offloading the soft real-time tasks of the industrial automation system to the intelligent communication devices for execution by the intelligent communication devices according to the second schedule;

by the human-machine-interaction panel, computing a third schedule for execution of the firm real-time tasks of the industrial automation system by the cloud computing environment; and by the human-machine-interaction panel, offloading the firm real-time tasks of the industrial automation system for execution by the cloud computing environment according to the third schedule.

6. A method as in claim 5, wherein the second and the third schedules prioritize the soft real-time tasks and the firm real-time tasks according to performance characteristics of the offload destination resources, communication delays between the human-machine-interaction panel and the offload destination resources, and existing loads on the offload destination resources.

7. A method as in claim 5, wherein offloading the firm real-time tasks for execution by the cloud computing environment further comprises offloading the firm real-time tasks to at least one of the intelligent communication devices for execution by the cloud computing environment.

8. A method as in claim 5, wherein offloading the firm real-time tasks for execution by the cloud computing environment further comprises offloading the firm real-time tasks to the cloud computing environment.

9. A method as in claim 1, wherein the status of the offloaded human-machine-interaction tasks indicates that the human-machine-interaction panel has lost connectivity with the offload destination resource, the method further comprising:

by the human-machine-interaction panel, preempting the offloaded human-machine-interaction task by executing the task locally.

10. A method as in claim 1, further comprising:
by the human-machine-interaction panel, receiving an alarm notification; and
for each offload destination resource, by the human-machine-interaction panel:
determining whether user credentials of the resource have access rights to the alarm; and
only if the offload destination resource has access rights, transmitting the alarm from the human-machine-interaction panel to the offload destination resource.

11. A human-machine-interaction (HMI) panel for interacting with industrial automation equipment, the HMI panel implemented as a special purpose computer connected to machines of the industrial automation system by a special industry communication field bus, comprising:
a processor;
an input/output module connected to the processor and connectable for communication with the industrial automation equipment;
a network communications module connected to the processor and connectable for communication with offload destination resources;
a non-transitory computer-usable medium having computer readable instructions stored thereon that, when executed by the processor, cause the processor to perform operations for offloading human-machine-interaction tasks of the industrial automation equipment from the processor, the operations comprising:

classifying each human-machine-interaction task into one of at least a first task type of the industrial automation equipment and a second task type of the industrial automation equipment comprising soft real-time tasks having a penalty for finishing after a deadline and firm real-time tasks having a reward for finishing before the deadline wherein the penalty is an increasing function of a time by which the execution time exceeds the deadline, wherein the first task type and the second task type are classified according to real-time computing requirements;

computing a schedule for execution by the human-machine-interaction panel of the first type of human-machine-interaction tasks of the industrial automation equipment;

executing the first human-machine-interaction tasks of the industrial automation equipment according to the schedule;

identifying offload destination resources available to communicate via the network communications module with the human-machine interaction panel, wherein the offload destination resources are separate from the human-machine-interaction panel;

offloading the human-machine-interaction tasks of the industrial automation equipment of the second task type via the network communications module to the offload destination resources for execution by the offload destination resources; and periodically communicating via the network communications module with the offload destination resources to check a status of the offloaded human-machine-interaction tasks of the industrial automation equipment wherein all human-machine interaction tasks performed locally or remote to the human-machine interface panel are managed by the human-machine interface panel.

12. A human-machine-interaction panel as in claim 11, wherein categorizing the plurality of human-machine-interaction tasks is further according to data transmission costs between the human-machine-interaction panel and the offload destination resources available to the human-machine-interaction panel.

13. A human-machine-interaction panel as in claim 11, wherein the human-machine-interaction tasks of the first category are hard real-time task that have a highest priority of the human-machine-interaction tasks.

14. A human-machine-interaction panel as in claim 11, wherein the reward for finishing before a deadline is an increasing function of a time by which an execution time precedes the deadline.

15. A human-machine-interaction panel as in claim 11, wherein the offload destination resources comprise intelligent communication devices and a cloud computing environment; and wherein offloading the human-machine-interaction tasks of the second task type to the offload destination resources for execution by the offload destination resources further comprises:
computing a second schedule for execution of the soft real-time tasks by intelligent communication devices;
offloading the soft real-time tasks via the network communications module to the intelligent communication devices for execution by the intelligent communication devices according to the second schedule;
computing a third schedule for execution of the firm real-time tasks by the cloud computing environment; and offloading the firm real-time tasks via the network communications module for execution by the cloud computing environment according to the third schedule.

16. A human-machine-interaction panel as in claim 15, wherein the second and third schedules prioritize the soft real-time tasks and the firm real-time tasks according to performance characteristics of the offload destination resources, communication delays between the human-machine-interaction panel and the offload destination resources, and existing loads on the offload destination resources.

17. A human-machine-interaction panel as in claim 15, wherein offloading the firm real-time tasks for execution by the cloud computing environment further comprises offloading the firm real-time tasks to at least one of the intelligent communication devices for execution by the cloud computing environment.

18. A human-machine-interaction panel as in claim 15, wherein offloading the firm real-time tasks for execution by the cloud computing environment further comprises offloading the firm real-time tasks to the cloud computing environment.

19. A human-machine-interaction panel as in claim 11, wherein the status of the offloaded human-machine-interaction tasks indicates that the human-machine-interaction panel has lost connectivity with the offload destination resource, the operations further comprising:

preempting the dropped offloaded human-machine-interaction task by executing the task locally.

20. A human-machine-interaction panel as in claim 11, wherein the operations further comprise:

receiving an alarm notification; and for each offload destination resource:

determining whether user credentials of the resource have access rights to the alarm; and only if the offload destination resource has access rights, transmitting the alarm from the human-machine-interaction panel via the network communications module to the offload destination resource.

* * * * *